J. D. PIERCE.
Eave-Trough Supports.
No. 134,163. Patented Dec. 24, 1872.
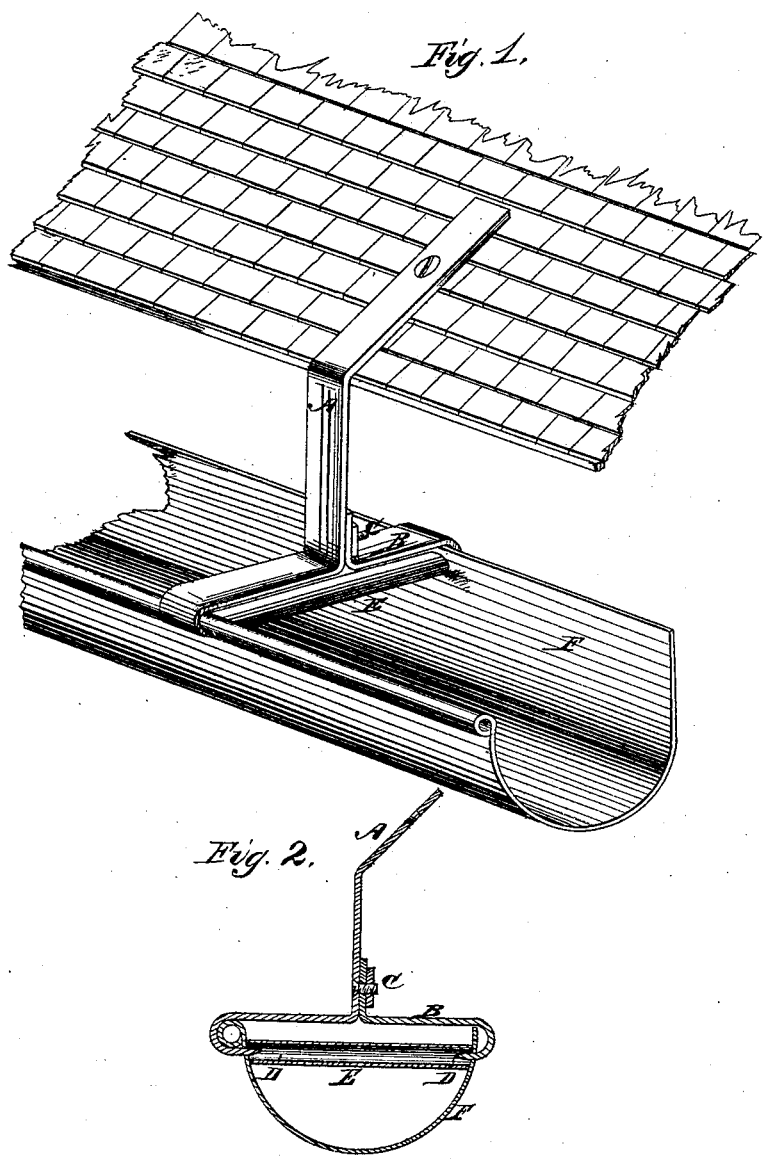

UNITED STATES PATENT OFFICE.

JAMES D. PIERCE, OF MILWAUKEE, WISCONSIN.

IMPROVEMENT IN EAVES-TROUGH SUPPORTS.

Specification forming part of Letters Patent No. 134,163, dated December 24, 1872; antedated December 23, 1872.

*To all whom it may concern:*

Be it known that I, JAMES D. PIERCE, of Milwaukee, in the county of Milwaukee in the State of Wisconsin, have invented certain Improvements in Eaves-Trough Supports, of which the following is a specification:

Nature and Object of the Invention.

My invention is for hanging eaves-troughs under the eaves of buildings, and is an arrangement with a screw and nut which brings it up together, the ends lapping over the edges of the eaves-trough, perforating the metal and entering a hollow cross-bar for the purpose of holding the trough in place without soldering.

Description of the Drawing forming part of this Specification.

Figure 1 is a perspective view, and Fig. 2 is a sectional view.

General Description.

A is the long part of the support, and the part which fastens to the roof; B, the short part of the support, secured to part A by the screw and nut C. D D are the sharp ends of parts A and B, which perforate the eaves-trough and enter the hollow cross-bar E. F is the eaves-trough.

To put the eaves-trough up and attach the support, the sharp ends D D are pressed through the tin eaves-trough and made to enter the hollow cross-bar E; then the screw is inserted and the nut screwed up, and the part A fastened to the roof.

Claims.

I claim as my invention—

1. Parts A and B, with cross-bar E and screw and nut C, arranged substantially as described.

2. Parts A and B, with sharp points D D, cross-bar E, screw and nut C, in combination with eaves-trough F, substantially as described.

JAMES D. PIERCE.

Witnesses:
J. B. SMITH,
W. M. HORNOR.